United States Patent
Mishra et al.

(10) Patent No.: US 11,087,158 B2
(45) Date of Patent: Aug. 10, 2021

(54) ERROR CORRECTION OF AIRBORNE VEHICLES USING NATURAL PATTERNS

(71) Applicant: Amazon Technologies, Inc., Seattle, WA (US)

(72) Inventors: Pragyana K. Mishra, Seattle, WA (US); Gur Kimchi, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/436,718

(22) Filed: Jun. 10, 2019

(65) Prior Publication Data

US 2020/0387727 A1 Dec. 10, 2020

(51) Int. Cl.
| | |
|---|---|
| G06K 9/03 | (2006.01) |
| G06T 7/73 | (2017.01) |
| B64C 39/02 | (2006.01) |
| B64D 47/08 | (2006.01) |
| G06K 9/00 | (2006.01) |
| G06K 9/62 | (2006.01) |

(52) U.S. Cl.
CPC ............ *G06K 9/03* (2013.01); *B64C 39/024* (2013.01); *B64D 47/08* (2013.01); *G06K 9/0063* (2013.01); *G06K 9/6262* (2013.01); *G06T 7/74* (2017.01); *B64C 2201/127* (2013.01)

(58) Field of Classification Search
None
See application file for complete search history.

(56) References Cited

U.S. PATENT DOCUMENTS

| | | | |
|---|---|---|---|
| 2009/0228204 A1 | 9/2009 | Zavoli et al. | |
| 2016/0116914 A1* | 4/2016 | Mucci | G05D 1/101 701/2 |
| 2017/0076616 A1* | 3/2017 | Kanade | G08G 5/045 |
| 2017/0185849 A1* | 6/2017 | High | G06K 9/66 |
| 2018/0045519 A1* | 2/2018 | Ghadiok | G06K 9/2054 |
| 2019/0072392 A1 | 3/2019 | Haspel et al. | |

OTHER PUBLICATIONS

International Search Report and Written Opinion dated Oct. 14, 2020, issued in corresponding International Application No. PCT/US2020/036817.

\* cited by examiner

*Primary Examiner* — Christopher G Findley
(74) *Attorney, Agent, or Firm* — Athorus, PLLC (57) ABSTRACT

Disclosed are systems and methods for in-transit or in-flight error correction in state prediction of the vehicle. Natural patterns, such as fields, residential neighborhoods, business areas (e.g., downtown), etc., and/or objects, such as streets, cars, houses, trees, buildings, bridges, roads, parking lots, etc., that are naturally within the environment may be determined and used to correct any error in the aerial vehicle state prediction, while the vehicle is in transit, thereby eliminating or reducing the cumulative error involved in traditional systems.

20 Claims, 9 Drawing Sheets

ERROR CORRECTION OF AIRBORNE VEHICLES USING NATURAL PATTERNS

BACKGROUND

Unmanned vehicles, such as unmanned aerial vehicles, automated ground vehicles, and water based automated vehicles, are continuing to increase in use. For example, aerial vehicles are often used by hobbyists to obtain aerial images of buildings, landscapes, etc. While there are many beneficial uses of these vehicles, operating and navigating aerial vehicles safely and efficiently within various environments may be challenging. Many systems now use sensor data to determine the pose, altitude, velocity, etc. of the vehicle. For example, some vehicles may utilize a dead reckoning process, in which vehicle position is determined based on the vehicle's prior position and the vehicle speed over a period of time. However, dead reckoning is subject to cumulative errors that increase as navigation continues.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Described are systems and methods for in-transit or in-flight error correction resultant from drift or cumulative error through the use of objects or patterns in the naturally occurring environment in which the aerial vehicle is operating. For example, natural patterns, such as fields, residential neighborhoods, business areas (e.g., downtown), etc., and/or objects, such as streets, cars, houses, trees, buildings, bridges, roads, parking lots, rivers, lakes, ponds, etc., that are naturally within the environment may be determined and used to correct any error in the aerial vehicle state calculations, while the vehicle is in transit, thereby eliminating or reducing the cumulative error involved in traditional systems. In one example, an object attribute data store may be maintained that includes attributes (e.g., size, position, orientation, dimensions, shape, curvature, angles, color, texture, etc.) about objects and/or patterns within the environment that may be used in conjunction with measured object information determined from sensors of the vehicle while the vehicle is in transit to determine and then resolve any error in the vehicle systems, sensors, and/or calculations. In one example, any determined error may be accounted for in an Extended Kalman Filter ("EKF") of the vehicle control system when determining the state of the vehicle. The "state" of a vehicle, as used herein, is any measured information about the vehicle and includes, but is not limited to, altitude, orientation, heading, dead reckoning, pose, speed, velocity, pitch, yaw, roll, etc.

While the disclosed examples focus primarily on aerial vehicles, it will be appreciated that the disclosed implementations may likewise be utilized to provide in-transit error correction for other types of vehicles. Vehicles that may be used with the disclosed implementations include, but are not limited to, aerial vehicles, unmanned aerial vehicles, ground based vehicles, unmanned ground based vehicles, water based vehicles, and/or unmanned water based vehicles.

For ease of discussion, the disclosed implementations refer to objects generally. "Object" or "objects," as used herein, include individual objects, groups of objects, or patterns formed by objects that are naturally occurring within an environment. For example, an object, as used herein, may be a box trailer of a semi, a field of row-crops, or a residential neighborhood. In general, an object, as used herein, is any one or more objects that may be detected through processing of sensor data obtained from vehicle sensors while the vehicle is in-transit (e.g., in-flight).

Figure 1:
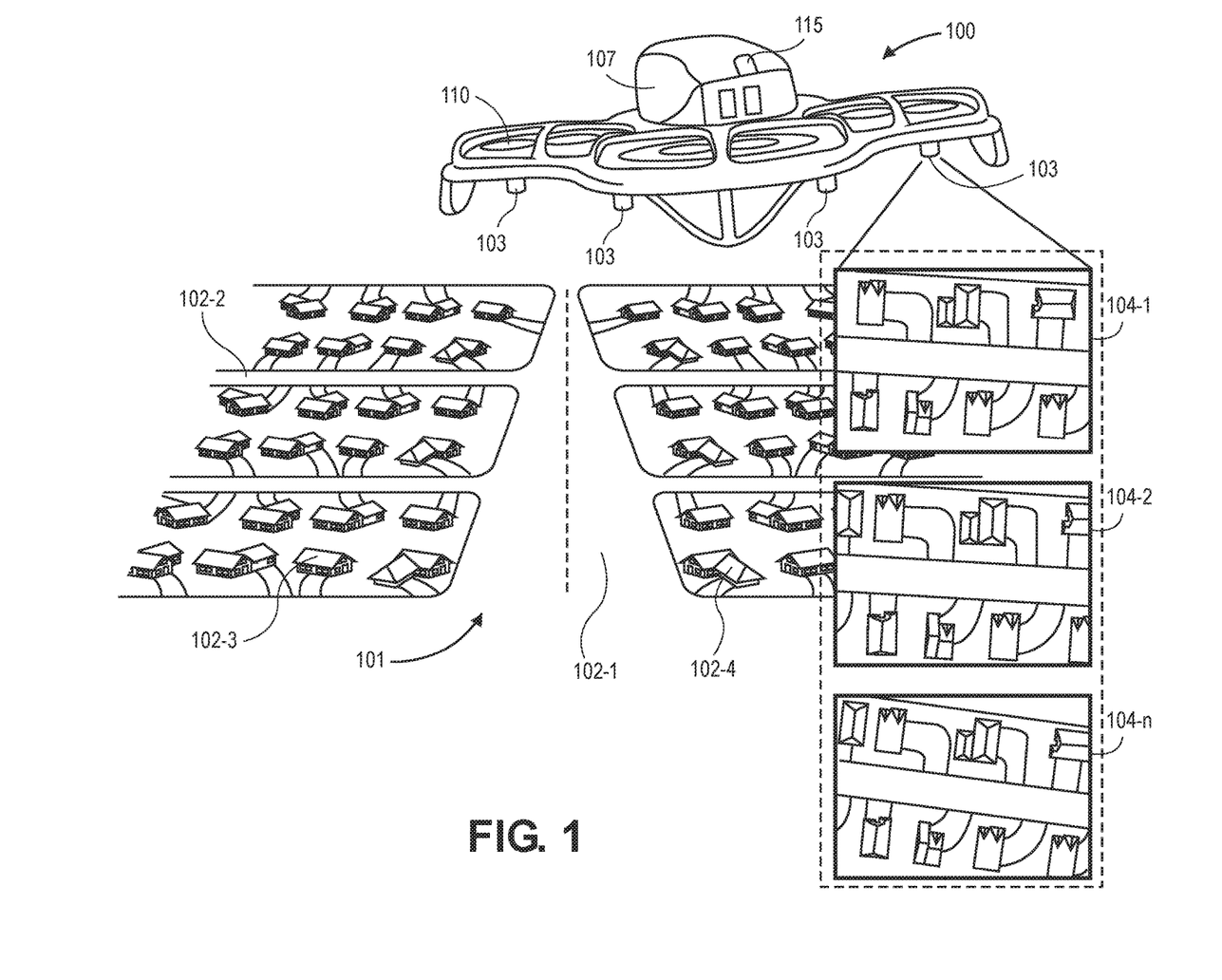
FIG. 1 is a schematic diagram of example in-flight error correction of an aerial vehicle using natural patterns within an environment, in accordance with disclosed implementations.

FIG. 1 is a schematic diagram of example in-flight error correction of an aerial vehicle using natural patterns within an environment, in accordance with disclosed implementations.

As illustrated in FIG. 1, an aerial vehicle 100 may include a frame or body 107, and a plurality of propulsion mechanisms, such as motors and propellers 110, coupled to the frame or body 107. The frame or body 107 may be formed of any suitable materials, such as carbon fiber, metals, plastics, or combinations thereof. In addition, the motors and propellers 110 may be coupled to the frame or body 107, or via one or more motor arms extending from the frame or body 107. The motors may be any suitable motors for rotating respective propellers 110 to generate thrust to lift or maneuver at least a portion of the aerial vehicle 100. The propellers 110 may be formed of any suitable materials, such as carbon fiber, metals, plastics, or combinations thereof. Further, the aerial vehicle 100 may also include a control system 115 that may control operation and navigation of the aerial vehicle 100, including aspects related to operation of the motors and propellers 110 and/or navigation of the aerial vehicle 100.

The aerial vehicle 100 may also include one or more sensors 103 that obtain data about the environment in which the aerial vehicle 100 is operating and/or about the aerial vehicle 100. Sensors 103 include, but are not limited to, cameras, such as still cameras, color (red, green, blue) cameras, depth sensing cameras, infrared cameras, video cameras, thermal imaging cameras, etc., Global Positioning System ("GPS") sensors, cameras, Light Detection and Ranging ("LIDAR") sensors, Inertial Measurement Unit ("IMU"), an accelerometer, a gyroscope, a compass, an odometry sensor, a magnetometer, a pitot tube, a barometer, an Inertial Navigation System ("INS"), etc.

Although FIG. 1 shows an aerial vehicle having a particular shape, size, number of motors and propellers, and overall configuration, the systems and methods described herein may be utilized with aerial vehicles having various other shapes, sizes, numbers of motors and propellers, and overall configurations, such as tricopters, quadcopters, hexacopters, octocopters, or various other types of aerial vehicles. In addition, aerial vehicles may include other types of propulsion mechanisms, such as fans, jets, turbojets, turbo fans, jet engines, electric jets, and/or combinations thereof, that may generate noise patterns.

In example implementations, the aerial vehicle 100 may be navigating within an environment 101 having various types of objects 102 that are naturally or normally in the environment 101. For example, as shown in FIG. 1, the aerial vehicle 100 may be in-flight or in-transit over a residential neighborhood that includes several objects 102, such as streets 102-1, 102-2 and homes 102-3, 102-4. As illustrated, the objects within the neighborhood form a pattern in the arrangement and layout of the objects, with homes 102-3, 102-4 aligned alongside the streets 102-1, 102-2. Attributes, such as the dimensions of the neighborhood, positioning of houses, orientation of streets, etc., may be obtained or collected, stored in an object data store and associated with the environment. For example, government bodies and many third parties maintain data on neighborhoods, such as topography, GPS data, building sizes and locations, street data (e.g., size, direction, location), etc. In addition, image data and/or other sensor data may be collected over time for the area, by the aerial vehicle 100, by other aerial vehicles, and/or by other vehicles (e.g., ground based vehicles) and added to the object data store for the location. Attributes known about an object, which as discussed above may be a single object or multiple objects (e.g., neighborhood), that are maintained in a data store or are otherwise accessible, are referred to herein as "stored object attributes" or "known object attributes" of those objects.

During aerial flight of the aerial vehicle 100, the vehicle may also collect sensor data, such as image data, corresponding to the environment 101. For example, image data 104-1, 104-2 through 104-N may be generated by one of the sensors 103 of the aerial vehicle 100 as the aerial vehicle is in-flight in the environment 100. As discussed further below, the sensor data collected by sensors of the aerial vehicle 100 may be processed to determine objects within the environment and represented in the sensor data. In addition, the same or different sensor data may be processed to determine object attributes of those objects. Object attributes determined from sensor data generated by sensors of the aerial vehicle while the aerial vehicle is in operation are referred to herein as "measured object attributes."

The control system 115 of the aerial vehicle may include one or more processors and a memory that stores program instructions that when executed by the one or more processors cause the one or more processors determine one or more objects or object types of objects represented in sensor data collected or generated by the one or more sensors 103 of the aerial vehicle 100. In addition, the control system 115 may also further process the sensor data to determine one or more measured object attributes corresponding to the determined objects. Likewise, stored object attribute data may also be obtained from a stored object data store accessible by the control system. In some implementations, the data store may be maintained on the aerial vehicle 100. In other implementations, the data store may be remote from the aerial vehicle but accessible by the control system 115 through one or more networks, such as the Internet.

The control system 115 may also determine a difference between the measured object attributes and the stored object attributes and utilize that difference to account for and reduce error in the predicted state of the aerial vehicle. The predicted state of the aerial vehicle is based at least in part on a prior predicted state of the aerial vehicle, a time difference between the current time and the time at which the prior predicted state was determined, a direction of the aerial vehicle as determined from one or more of the sensors 103, a velocity of the aerial vehicle as determined from one or more of the sensors 103, and an altitude of the aerial vehicle as determined from one or more of the sensors.

Figure 2:
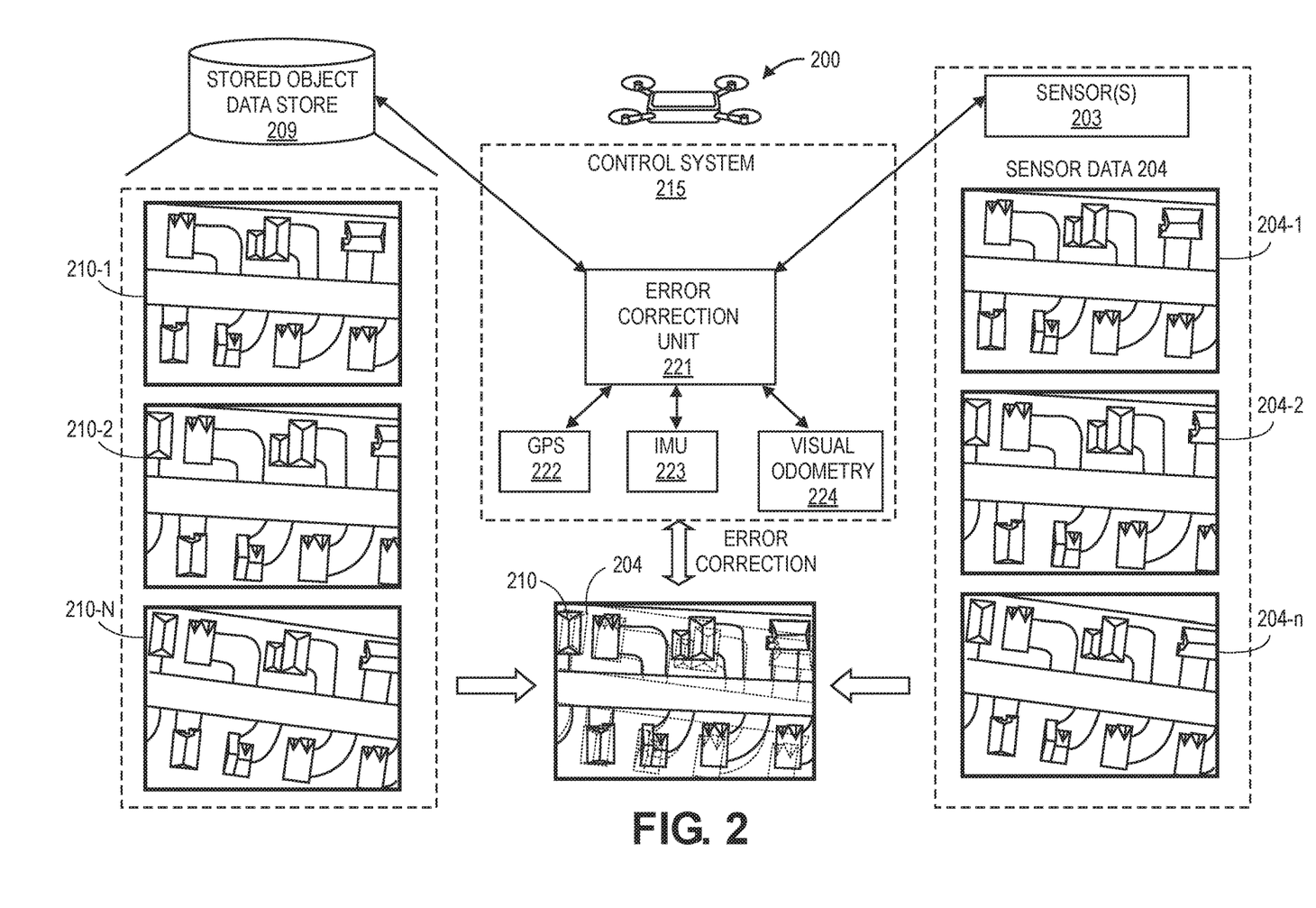
FIG. 2 is a schematic diagram of another example in-flight error correction of an aerial vehicle using natural patterns within an environment, in accordance with disclosed implementations.

FIG. 2 provides another example in-flight error correction of an aerial vehicle 200 using objects naturally present within an environment, in accordance with disclosed implementations.

In the illustrated example, an aerial vehicle 200 has generated sensor data 204-1, 204-2, 204-3 through 204-N from one or more sensors 203 of the aerial vehicle. In this example, the sensor data 204 is image data generated by a camera of the aerial vehicle as the aerial vehicle is operating in the environment. The control system 215, which in this example includes an error correction unit 221, processes the image data to determine objects, such as patterns, houses, streets, trees, etc., represented in the image data. For each determined object and/or for the portion of the environment represented in the image data, stored object attributes are obtained from the stored object data store 209. Stored object attributes may include, among other information, the actual or known size of the object, shape of the object, color of the object, position of the object, type of the object, dimensions of the object, images of the object, angles of the object, curvatures of the object, positions of the object, textures of the object, etc. In FIG. 2, stored object attributes 210-1, 210-2, through 210-N are illustrated as examples and may represent images of objects within the environment. Regardless of the type or source of the stored object attributes, those stored object attributes are accurate, or are assumed to be accurate for that object.

In addition to determining the object(s) represented in the sensor data generated by sensors of the aerial vehicle and obtaining corresponding stored object attributes, the error correction unit likewise determines measured object attributes for those objects. For example, sensor data from the GPS 222, IMU 223, and/or visual odometry sensors 224 may be used with the sensor data 204 to determine position, size, shape, dimensions, speed, velocity, position, orientation, shape, curvature, texture, etc. (measured object attributes) for objects represented in the sensor data, as perceived by the aerial vehicle 200. The measured object attributes may then be compared with stored object attributes to determine a difference between the stored object attributes and the measured objected attributes. FIG. 2 provides a visual illustration of the comparison showing a visual representation of the measured object attributes 204 as dashed lines of the sensor data and the stored object attributes 210 as solid lines projected in an overlapping manner. As illustrated, it is apparent that there is error in the current sensor data of the aerial vehicle when compared with the stored object attributes 210.

As discussed in further detail below, the difference may be computed and utilized as an error adjustment in an EKF of the control system to correct the state prediction of the aerial vehicle. As is known, the dead reckoning or pose of the aerial vehicle indicates the orientation and heading of the aerial vehicle and is determined based at least in part on a prior pose/dead reckoning of the aerial vehicle, a time difference between the prior pose and the current time, and at least one of direction, velocity and altitude of the aerial vehicle. In the disclosed implementations, the state prediction is determined based at least in part on the prior state prediction of the vehicle, a time difference between the prior state prediction determination and a current time and at least one of direction and velocity, and the determined error.

This correction of the state prediction of the aerial vehicle realized with the disclosed implementations provides a technical improvement over existing systems because it reduces or removes the cumulative error that decrease the accuracy of other systems. Likewise, because the implementations utilize information about existing objects in the environment that are encountered by the vehicle during normal operation, the disclosed implementations maybe continually or periodically performed during in-flight operation of the aerial vehicle. In addition to correcting error on the predicted state of the vehicle, the disclosed systems may also be used to adjust, correct or re-calibrate one or more sensors during in-flight operation of the vehicle.

Figure 3:
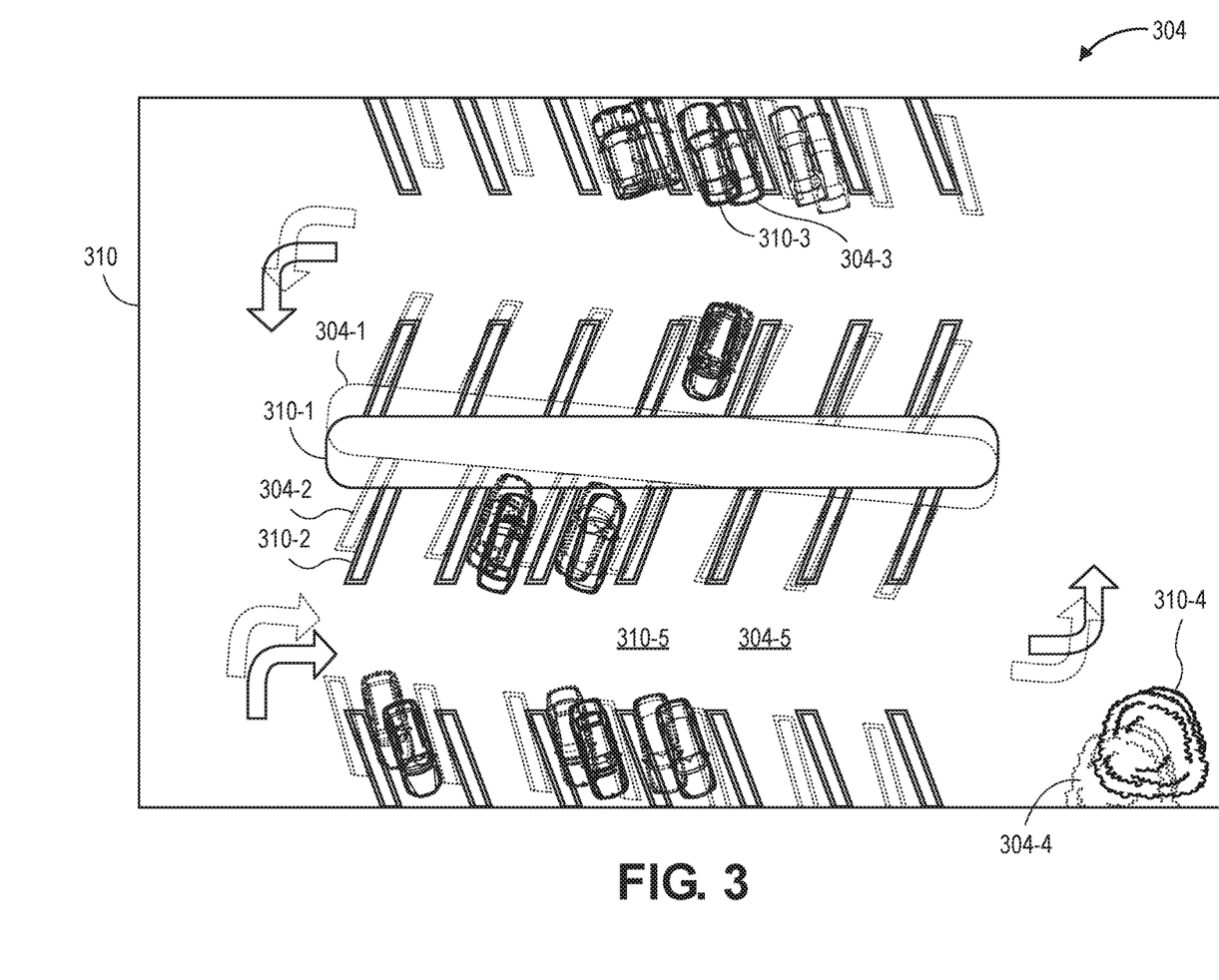
FIG. 3 is a schematic diagram of another example in-flight error correction of an aerial vehicle using natural patterns within an environment, in accordance with disclosed implementations.

FIG. 3 is a schematic diagram of another example in-flight error correction of an aerial vehicle using natural patterns within an environment, in accordance with disclosed implementations. FIG. 3 is an illustration of stored object attributes 310 of a parking lot, illustrated as sold lines, and measured object attributes 304 of the parking lot, illustrated as dashed lines. In the disclosed implementations, there are multiple objects in the environment that are detected. For example, the parking lot 304-5/310-5 is an object, the median 304-1/310-1 is an object, the tree 304-4/310-4 is an object, the parking lot lines 304-2/310-2 are objects, and the automobiles 304-3/310-3 are objects.

As discussed herein, each of the objects, such as the parking lot, median, tree, parking lot lines, automobiles, etc., represented in the sensor data may be detected through a processing of the sensor data. Measured object attributes (e.g., size, position, shape, orientation, speed, dimensions, etc.) of those objects may likewise be compared with stored object attributes to determine a difference and that difference may be used to correct a state prediction of the aerial vehicle during flight of the aerial vehicle.

In the FIG. 3 illustration of the measured object attributes 304 and the stored object attributes 310 it is apparent that the measured or perceived object attributes include error, as illustrated by the difference between the measured object attributes 304, illustrated as dashed lines, and the stored object attributes 310, illustrated as solid lines. With the implementations disclosed herein, the error is corrected during flight of the aerial vehicle and determined based on object naturally present in the environment in which the aerial vehicle is operating.

Figure 4:
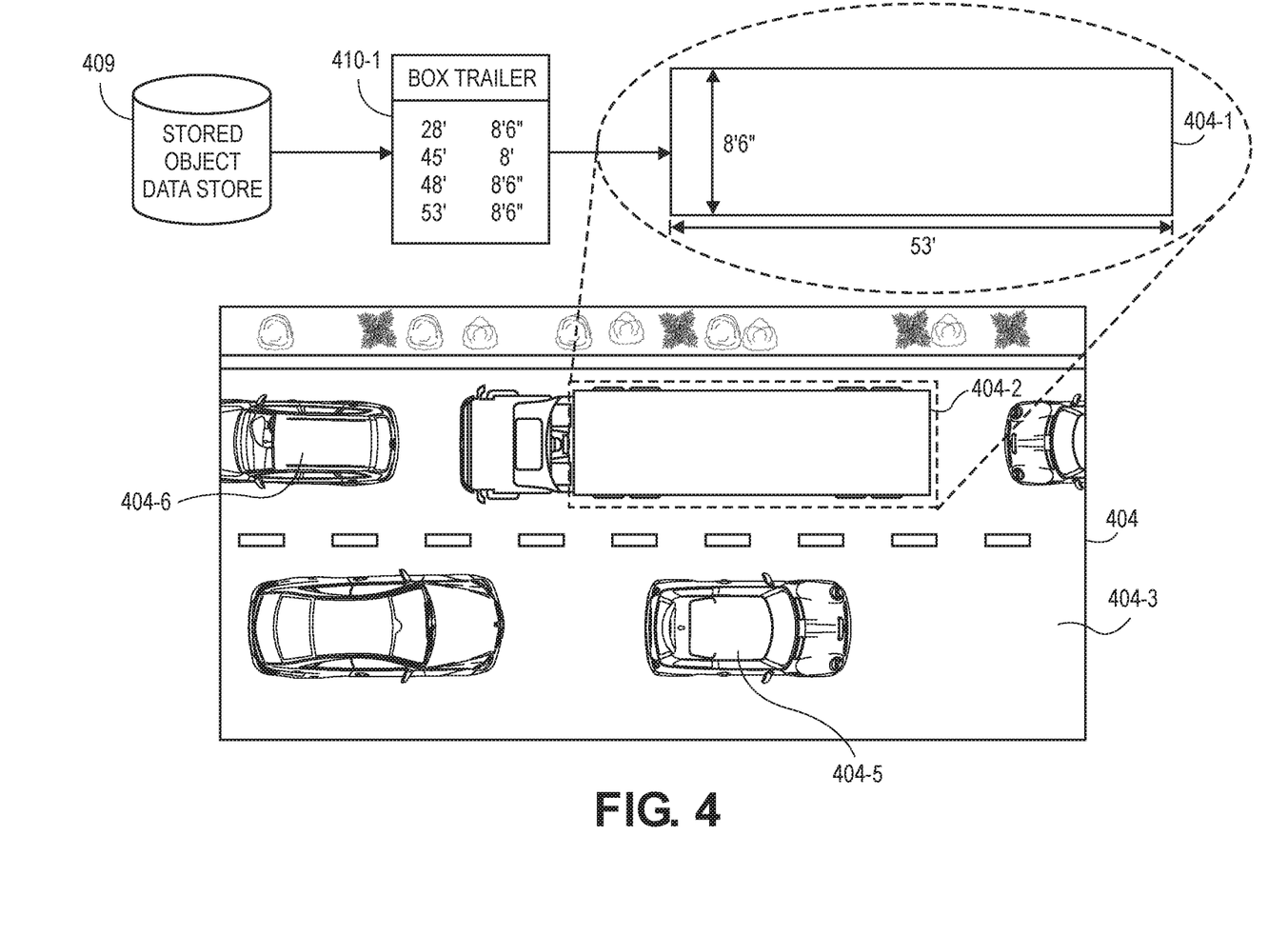
FIG. 4 is a schematic diagram of another example in-flight error correction of an aerial vehicle using natural patterns within an environment, in accordance with disclosed implementations.

FIG. 4 is a schematic diagram of another example in-flight error correction of an aerial vehicle using natural patterns within an environment, in accordance with disclosed implementations. In the illustrated example, sensor data 404 includes a representation of a street 404-3 with vehicles 404-2, 404-5, 404-6, etc. In this example, the sensor data 404 is processed and it is determined that a semi-truck 404-2 with a box trailer 404-1 is represented in the image data, along with several other objects. In this example, the image data is further processed to determine the dimensions of the box trailer 404-1 as perceived by the sensors of the aerial vehicle. Likewise, dimension information 410-1 for standard box trailers is obtained from the object data store 409 and compared to the dimensions determined from the image data. In this example, the measured attribute data of the box trailer dimensions (53'×8' 6") corresponds to one of the dimension information of the stored object attributes corresponding to box trailers. As such, it may be determined that no error correction is necessary for the aerial vehicle at this point in time.

Figure 5:
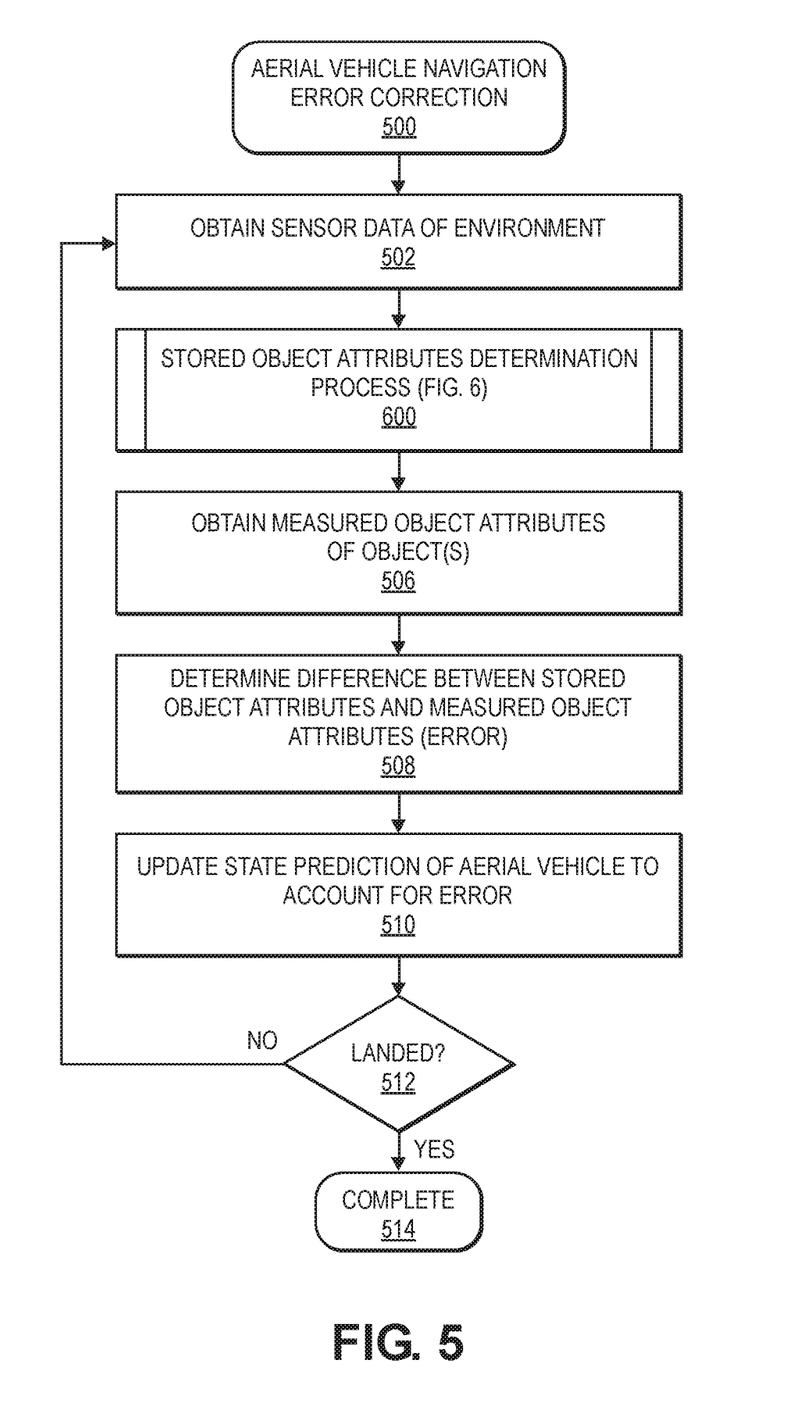
FIG. 5 is a flow diagram illustrating an example vehicle in-transit error correction process, in accordance with disclosed implementations.

FIG. 5 is a flow diagram illustrating an example vehicle in-transit error correction process 500, in accordance with disclosed implementations.

The example process 500 may be performed continuously, periodically, or on command at any time during in-flight operation of the aerial vehicle. The example process 500 begins by obtaining sensor data of the environment in which the aerial vehicle is operating, as in 502. As discussed above, the sensor data may be any form of sensor data that is representative of the environment. For example, sensor data may include images (thermal, color, greyscale, IR), video, depth information, etc.

As sensor data is obtained, the stored object attributes process 600 is performed. The example process 600 is discussed further below with respect to FIG. 6. As discussed below, the example process 600 may return stored object attributes corresponding to one or more objects represented in the sensor data.

In addition to obtaining stored object attributes, the example process 500 determines measured object attributes for the one or more objects represented in the sensor data, as perceived by the aerial vehicle, as in 506. In some implementations, rather than obtaining measured object attributes for all objects represented in the sensor data, the example process 500 may only determine measured object attributes corresponding to objects for which the example process 600 (FIG. 6) returned stored object attributes. For example, the stored object attributes process 600 may only return stored object attributes for three objects represented in the sensor data, even though there may have been more than three objects represented in the sensor data. This may be done for a variety of reasons, as discussed further below. The measured object attributes, such as the position, orientation, size, shape, color, dimensions, velocity, etc., of the object may be determined based on the sensor data generated by other sensors of the aerial vehicle. For example, the size and/or dimensions of the object may be determined based on the focal length of an imaging device and the altitude of the aerial vehicle. As another example, the position or orientation of an object may be determined based on the GPS data and the determined heading or direction of the aerial vehicle.

The example process 500 may then determine differences between the stored object attributes and the measured object attributes, also referred to herein as the error, as in 508. Any of a variety of techniques may be used to determine differences between the stored object attributes and the measure object attributes. For example, image data may be generated by a camera of the aerial vehicle and processed to determine one or more objects in the image data. Measured object attributes about that object may also be determined based on the sensors of the aerial vehicle. For example, if the object is a residential house, the sensors data from various sensors (e.g., altimeter, camera, GPS, IMU, etc) may be utilized to determine the size and position of the house. Likewise, the sensor data may be utilized to determine stored object attributes corresponding to the object when viewed from a particular position (e.g., altitude, orientation, vehicle position, etc.). The measured object attributes and the stored object attributes may then be compared to determine any differences. The difference may be represented, for example, as a percentage difference, a pixel variation difference, etc. The differences indicate an error in one or more sensors, or a cumulative error in the predicted state of the vehicle.

Utilizing the determined error, the state prediction of the aerial vehicle is updated to account for the error, as in 510. As discussed below, the state prediction is updated by including the error the EKF utilized by the control system to determine the state prediction of the aerial vehicle. Alternatively, or in addition thereto, one or more sensors may be calibrated or adjusted based at least in part on the determined error.

A determination is then made as to whether the vehicle has landed, as in 512. If it is determined that the aerial vehicle has landed, the example process completes, as in 514. However, if it is determined that the aerial vehicle has not landed and is still in-flight, the example process 500 returns to block 502 and continues. Specifically, the example process 500 may be performed continuously during any aerial navigation or operation of the aerial vehicle to continuously determine any error and correct that error in the state prediction of the aerial vehicle, thereby eliminating or reducing any cumulative error that is present in traditional systems.

Figure 6:
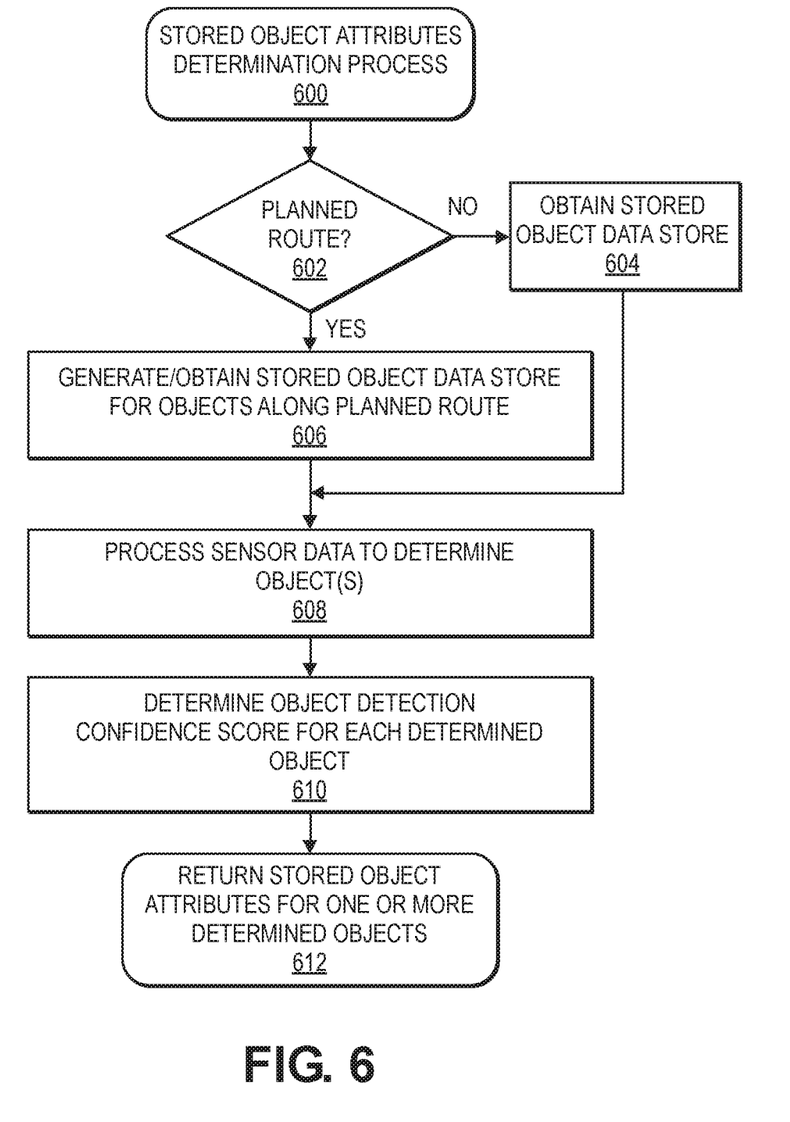
FIG. 6 is a flow diagram illustrating an example object attributes determination process, in accordance with disclosed implementations.

FIG. 6 is a flow diagram illustrating an example object attributes determination process 600, in accordance with disclosed implementations. The example process 600 begins by determining if the aerial vehicle is navigating along a planned route, as in 602. If it is determined that the aerial vehicle is not navigating along a planned route, a general stored objects data store that includes stored object attributes for objects is obtained, as in 604. The general stored objects data store may be a master data store of all stored object attributes that have been collected over time from any of a variety of sources. In other examples, the general stored objects data store may include stored object attributes for objects naturally occurring in a region or range of the aerial vehicle. For example, if the maximum flight time of the aerial vehicle is one-hour and the maximum speed of the aerial vehicle is seventy-five miles per hour, object attributes for all objects known to be within a seventy-five mile radius of the aerial vehicle's current location may be determined and used to form a general stored object data store.

If it is determined at decision block 602 that the aerial vehicle is or will be traveling along a planned route, the example process 600 generates or obtains a stored object data store or objects known to be along the planned route, as in 606. For example, the aerial vehicle may be scheduled to navigate along a route that has been traversed several times by other aerial vehicles and/or object attributes have been obtained from other sources. In such an example, the data store of object attributes and the list of potential objects to be detected by the aerial vehicle is reduced, thereby increasing the speed and accuracy of object detection along the route.

As the aerial vehicle is in-transit, sensor data collected by the one or more sensors of the aerial vehicle is processed to determine one or more objects represented in the sensor data, as in 608. As discussed above, objects may include a single object or a group or pattern of objects that naturally exist within the environment in which the aerial vehicle is operating.

Processing of the sensor data to detect the objects may utilize any of a number of object detection algorithms. For example, edges, contours, outlines, colors, textures, silhouettes, shapes or other characteristics of objects, or portions of objects, represented in the sensor data may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the sensor data as closely as possible, and in a manner that minimizes noise and disruptions, and does not create false transitions. Some detection algorithms or techniques that may be utilized in order to determine objects or portions thereof in the sensor data in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts. For example, objects or portions thereof represented in imaging data, a form of sensor data, may be associated with a label or labels according to one or more machine-learning classifiers, algorithms or techniques, including but not limited to nearest neighbor methods or analyses, artificial neural networks, factorization methods or techniques, K-means clustering analyses or techniques, similarity measures such as log likelihood similarities or cosine similarities, latent Dirichlet allocations or other topic models, or latent semantic analyses.

Regardless of the object detection technique used, as objects are detected, the stored object data store is queried to determine the identity of the object by comparing the object to objects indicated in the stored object data store. In some implementations, the list of candidate objects from the stored object data store may be further reduced based on, for example, the current position of the aerial vehicle and the known position of objects indicated in the stored object data store. For example, if the aerial vehicle is known to be positioned above a neighborhood, the list of potential objects may be reduced to only include objects known to be located in the neighborhood.

As objects are identified, an object detection confidence score indicative of a confidence that the object has been correctly determined is generated, as in 610. The object detection confidence score may be determined by comparing attributes or features of the object represented in the sensor data with attributes or features of the determined stored object. If there is a high similarity, it may be determined that there is a high degree of confidence that the object has been accurately determined. In comparison, if there is low similarity the object detection confidence score may be reduced.

Likewise, in some examples, the object detection confidence score may be weighted to account for the precision or standardization of the detected object. For example, if the detected object has low variability in object attributes, such as size, position, location, etc., the object detection confidence score may be increased. As one example, if the detected object is a box trailer of a semi-trailer, the box trailer is known to be standardized to one of a defined set of dimensions. As such, the object has low variability in the stored object attributes regarding possible dimensions of the object. As another example, if the object is a parking lot or road, the spacing between parking lines in the parking lot, or the spacing of the lane widths of the road also have low variability in dimensions because they are standardized. In comparison, if the object is a house or row of houses in a neighborhood and the stored object attributes include a range or average of house size for that area, the objects are considered to have high variability in the stored object attributes. In such an example, the object detection confidence score may be decreased to account for the high variability in object attributes for the determined objects.

In some implementations, the confidence score, if determined, may be used to rank the determined objects and the stored object attributes for the highest ranked or set of highest ranked objects may be returned, as in 612. In other implementations, the stored object attributes for all determined objects may be returned. Optionally, the object detection confidence score may also be returned as part of the example process 600.

Figure 7:
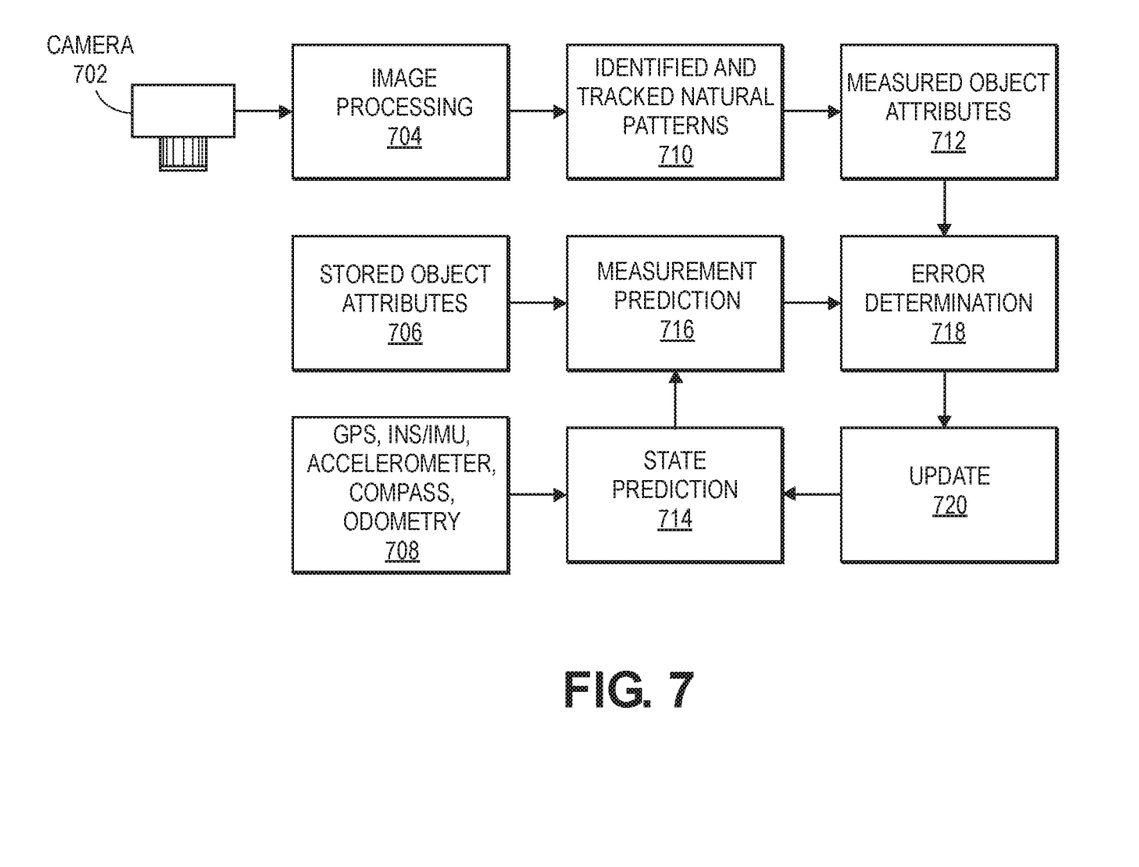
FIG. 7 is an example state transition diagram of an example error correction, in accordance with disclosed implementations.

FIG. 7 is an example state transition diagram of an example in-flight error correction, in accordance with disclosed implementations. The example discussed with respect to FIG. 7 utilizes a camera as the sensor and image data as the sensor data to aid in discussion. However, it will be appreciated that any type of sensor and corresponding sensor data may be utilized with the disclosed implementations.

At an initial state of the in-flight error correction, image data is obtained from a camera 702 of the aerial vehicle. The image data is processed using one or more image processing algorithms 704 to determine and identify objects 710 represented in the image data, as discussed herein. In addition to collecting image data, a state prediction 714 and measurement prediction 716 are performed. For example, the control system of the aerial vehicle may use EKF to determine both state prediction 714 and a measurement prediction 716. The EKF is a non-linear version of a Kalman Filter and assumes that the state transition and measurement probabilities are nonlinear functions, and takes into account the first-order terms in their Taylor series expansions.

The state prediction 714 is an estimate of the current state of the aerial vehicle and is determined based on the prior state of the aerial vehicle, the current priori prediction, and the current observation information obtained from sensor data 708 (e.g., GPS, INS, IMU, accelerometer, compass, odometry, etc.). The state predication can be represented as:

$$\vec{x}_k = f(\vec{x}_{k-1}, u_k, 0) \quad (1)$$

where $\vec{x}_k$ is a state vector that represents the pose (e.g., position, orientation, altitude, etc.) of the aerial vehicle at time step k, $\vec{x}_{k-1}$ is the prior state of the aerial vehicle, $u_k$ is the current measured sensor state, and 0 is assuming no error.

$$P_{\bar{k}} = A_k P_{k-1} A_k^T + W_k Q_k W_k^T \quad (2)$$

where $P_{\bar{k}}$ is a priori estimate of error covariance, $A_k$ is a Jacobian matrix of partial derivatives of f with respect to $\vec{x}$ at step k, $P_{k-1}$ is a posteriori estimate of error covariance at step k−1 (prior state of aerial vehicle), and $W_k$ is a Jacobian matrix of partial derivatives of f with respect to sensor noise W (e.g., variability or sensor tolerance) at step k.

The measurement prediction 716 can be represented as:

$$K_k = P_{\bar{k}} H_k^T (H_k P_{\bar{k}} H_k^T + V_k R_k V_k^T)^{-1} \quad (3)$$

where $K_k$ is the Kalman Gain, $H_k$ is a Jacobian matrix of partial derivatives of measurement H with respect to x at step k, $V_k$ is a Jacobian matrix of h with respect to noise W at step k, and $R_k$ is a measurement of noise covariance at step k.

In the disclosed implementations, the measurement prediction also considers the difference or error 718 determined between the measured object attributes 712 of detected objects and stored object attributes 706 for those detected objects. Factoring in the difference, we have:

$$x_k = x_k + K_k(Z_k - h(x_k, 0)) \quad (4)$$

$$P_k = (I - K_k H_k) P_{\bar{k}} \quad (5)$$

where h is the known or stored measurement of the object and the error is the difference between the sensor measurement $Z_k$ (measured object attributes) and the stored object attributes. $K_k(Z_k - h(x_k, 0))$ is the error term that is added to correct $x_k$ determined from the initial state prediction.

The measurement prediction 716, error determination 718, and update 720 correct the state and the covariance estimates with the measurement based on the stored object attributes of detected objects to continuously or periodically correct the input measurements, thereby minimizing drift in state prediction over time:

$$Z_k = h(x_k, x_{pattern}, v) = E(x_k - x_{pattern})$$

$$H_k 1 \left[ \frac{\partial h(x_k, x_{pattern}, 0)}{\partial x_k} \frac{\partial h(x_k, x_{pattern}, 0)}{\partial x_{pattern}} \right]$$

The described implementations describe the ability to use naturally occurring objects, which includes combinations of objects or patterns formed by objects, to correct errors accumulating in the aerial vehicle during operation of the aerial vehicle. Likewise, the disclosed implementations may be used to calibrate one or more sensors of the aerial vehicle while the aerial vehicle is in-flight.

Figure 8:
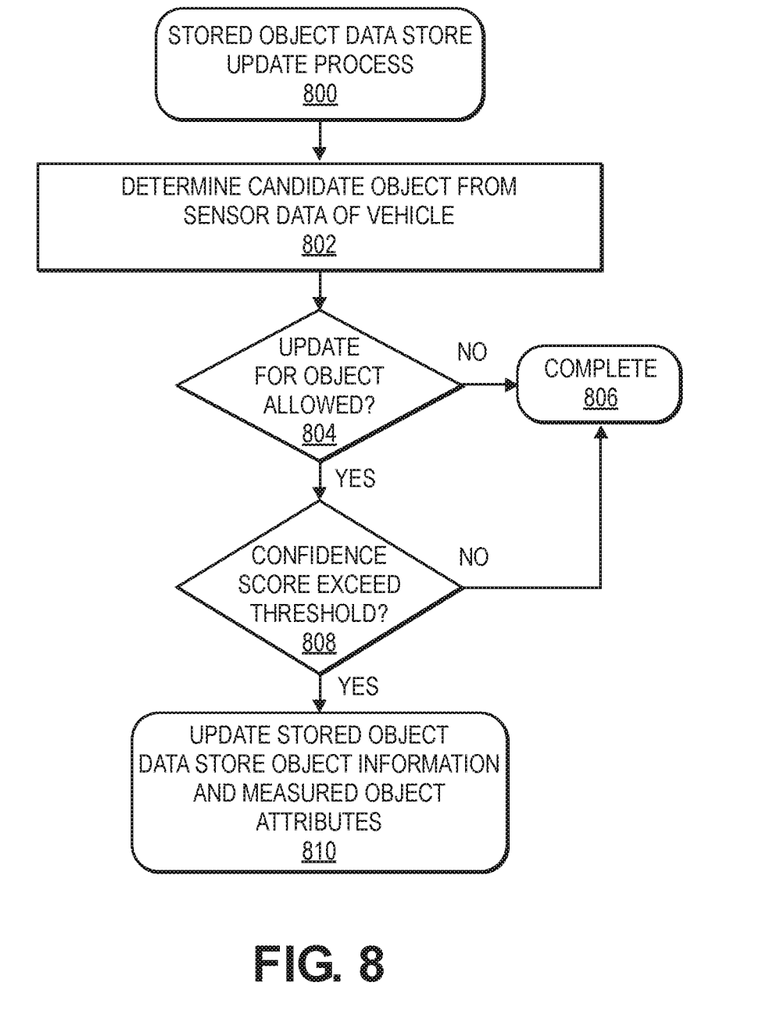
FIG. 8 is a flow diagram illustrating an example stored object data store update process, in accordance with disclosed implementations.

In addition to continually or periodically correcting the state of the aerial vehicle, the disclosed implementations may also update the stored object attributes data store. For example, FIG. 8 is a flow diagram illustrating an example stored object data store update process 800, in accordance with disclosed implementations. The example process 800 begins by determining a candidate object from sensor data collected by the aerial vehicle as the aerial vehicle is operating and navigating over an environment, as in 802.

For the determined object, it may be determined whether an update of the stored object attributes maintained in the data store is allowed, as in 804. As will be appreciated, some stored object attributes may be periodically updated while others may be standardized and not allowed for update. For example, if the stored object is a group of trees or row crops in a field, the stored object attributes may be available for update to account for changes (e.g., growth, harvest) of those objects. In comparison, if the object is a standardized object, such as a building, street, etc., for which standardized information is available or has been provided, it may be determined that the stored object attributes are not available for update. In some implementations, while stored object attributes may not be available for update, images or other sensor data for the objects may be updated and stored in the stored objects data store.

If it is determined that the object is not available for update, the example process 800 completes, as in 806. However, if it is determined that the object is available for update in the stored object data store, a determination is made as to whether the confidence score generated for the object exceeds a threshold, as in 808. The threshold may be any score, value, percentage, percentage of total, or other indicator and may vary for different objects, different types of sensor data, different aerial vehicles, etc.

If the confidence score does not exceed a threshold, the example process completes, as in 806. If the confidence score does exceed the threshold, the stored object attributes data store is updated with the determined object information and measured object attributes for the object, as in 810. As discussed, the object information and measured object attributes may include, for example, the type of object, the color of the object, the size of the object, the position of the object, the dimensions of the object, the shape of the object, the texture of the object, etc.

By updating the stored objects data store with information collected during operation of the aerial vehicle, the stored object data store is continually updated to include accurate and current information about objects naturally occurring within the environment. The stored object data store update process 800 may be performed with respect to any of a number of vehicles such that data from multiple sensors of multiple vehicles are provided to and used to update data maintained in the stored object data store.

Figure 9:
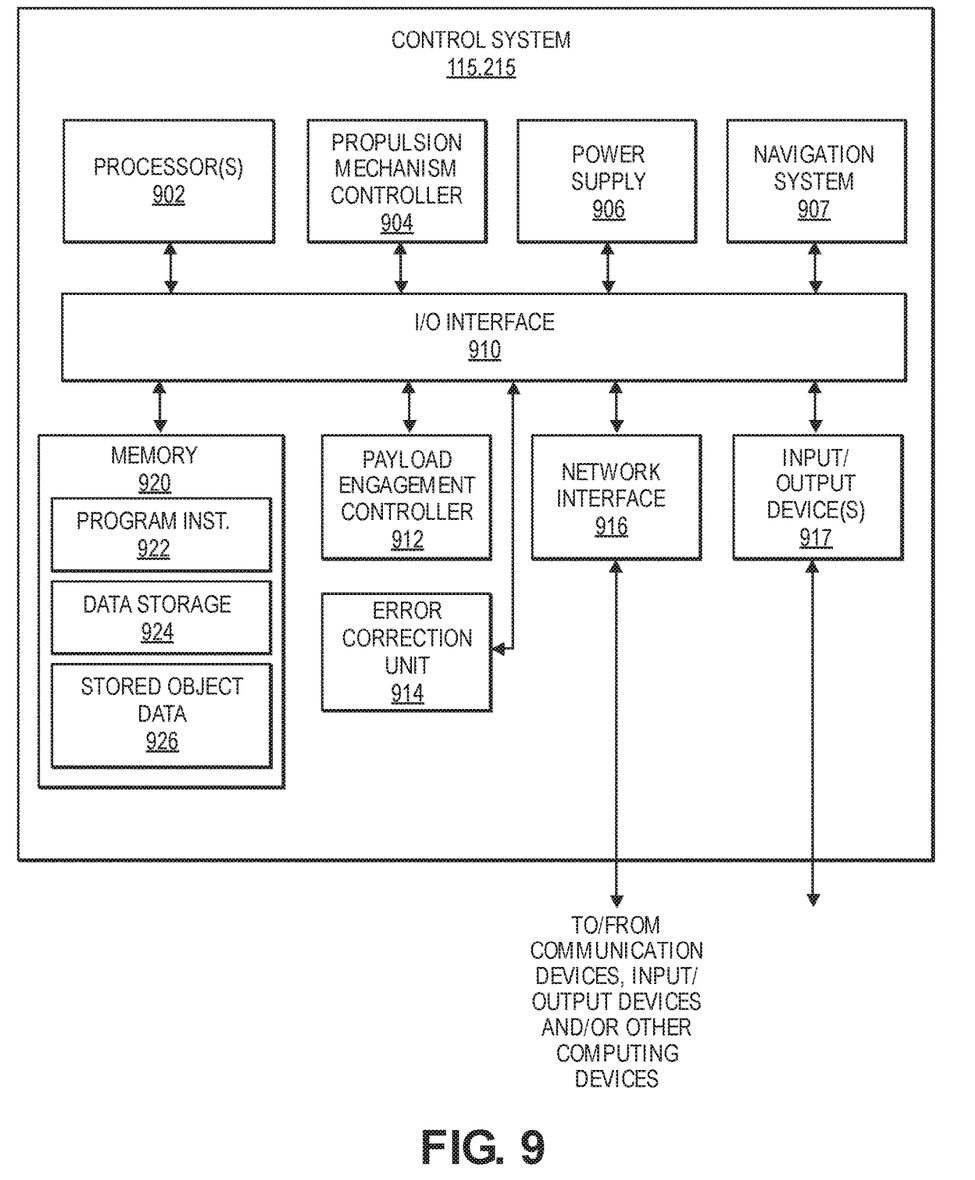
FIG. 9 is a block diagram illustrating various components of an example aerial vehicle control system, in accordance with disclosed implementations.

FIG. 9 is a block diagram illustrating various components of an example aerial vehicle control system 115, 215, in accordance with disclosed implementations.

In various examples, the block diagram may be illustrative of one or more aspects of the aerial vehicle control system that may be used to implement the various systems and methods discussed herein and/or to control operation of an aerial vehicle discussed herein. In the illustrated implementation, the aerial vehicle control system includes one or more processors 902, coupled to a memory, e.g., a non-transitory computer readable storage medium 920, via an input/output (I/O) interface 910. The aerial vehicle control system also includes propulsion mechanism controllers 904, such as electronic speed controls (ESCs) or motor controllers, power supplies or modules 906, and/or a navigation system 907. The aerial vehicle control system further includes a payload engagement controller 912, an error correction unit 914, a network interface 916, and one or more input/output devices 917.

In various implementations, the aerial vehicle control system may be a uniprocessor system including one processor 902, or a multiprocessor system including several processors 902 (e.g., two, four, eight, or another suitable number). The processor(s) 902 may be any suitable processor capable of executing instructions. For example, in various implementations, the processor(s) 902 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 902 may commonly, but not necessarily, implement the same ISA.

The non-transitory computer readable storage medium 920 may be configured to store executable instructions, data, propeller data, operational characteristics data, object attribute data, object data and properties thereof, environment data, and/or other data items accessible by the processor(s) 902. In various implementations, the non-transitory computer readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 920 as program instructions 922, data storage 924 and stored object data 926, respectively. In other implementations, program instructions, data, and/or stored object data may be received, sent, or stored upon different types of computer-accessible media, such as non-transitory media, or on similar media separate from the non-transitory computer readable storage medium 920 or the aerial vehicle control system. Generally speaking, a non-transitory, computer readable storage medium may include storage media or memory media such as magnetic or optical media, e.g., disk or CD/DVD-ROM, coupled to the aerial vehicle control system via the I/O interface 910. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 916.

In one implementation, the I/O interface 910 may be configured to coordinate I/O traffic between the processor(s) 902, the non-transitory computer readable storage medium 920, and any peripheral devices, the network interface or other peripheral interfaces, such as input/output devices 917. In some implementations, the I/O interface 910 may perform any necessary protocol, timing or other data transformations to convert data signals from one component (e.g., non-transitory computer readable storage medium 920) into a format suitable for use by another component (e.g., processor(s) 902). In some implementations, the I/O interface 910 may include support for devices attached through various types of peripheral buses, such as a variant of the Peripheral Component Interconnect (PCI) bus standard or the Universal Serial Bus (USB) standard, for example. In some implementations, the function of the I/O interface 910 may be split into two or more separate components, such as a north bridge and a south bridge, for example. Also, in some implementations, some or all of the functionality of the I/O interface 910, such as an interface to the non-transitory computer readable storage medium 920, may be incorporated directly into the processor(s) 902.

The propulsion mechanism controllers 904 may communicate with the navigation system 907 and adjust the rotational rate, position, orientation, blade pitch, or other parameters of each propulsion mechanism to implement one or more aerial vehicle flight plans or operations, and/or to perform one or more maneuvers and guide the aerial vehicle along a flight path and/or to a destination location. Although the description herein generally refers to motors and propellers that generate propeller noise patterns that may be reflected back by one or more objects, in other example implementations, aerial vehicles may include other types of propulsion mechanisms, such as fans, jets, turbojets, turbo fans, jet engines, electric jets, and/or combinations thereof, that may also generate noise that may be reflected back by one or more objects. In addition, one or more operational and/or structural characteristics of various other types of propulsion mechanisms may also be modified to select and generate particular noise patterns.

The navigation system 907 may include a global positioning system (GPS), indoor positioning system (IPS), or other similar system and/or sensors that can be used to navigate the aerial vehicle to and/or from a location. The payload engagement controller 912 communicates with the actuator(s) or motor(s) (e.g., a servo motor) used to engage and/or disengage items.

The error correction unit 914 may be used to compute the error between perceived object information and stored object attributes, as discussed herein and utilize that information to correct the state prediction of the aerial vehicle. As will be appreciated, the error correction unit 914 may be a standalone unit that is part of the control system, as illustrated, or the error correction unit may be incorporated into the navigation system 907. In still other implementations, some or all functions of the error correction unit may be performed by one or more computing resources that are remote from the control system 115, 215 and the results provided to the control system 115, 215 via the network interface 916.

The network interface 916 may be configured to allow data to be exchanged between the aerial vehicle control system, other devices attached to a network, such as other computer systems (e.g., remote computing resources), and/or with aerial vehicle control systems of other aerial vehicles. For example, the network interface 916 may enable wireless communication between the aerial vehicle and an aerial vehicle control system that is implemented on one or more remote computing resources. For wireless communication, an antenna of the aerial vehicle or other communication components may be utilized. As another example, the network interface 916 may enable wireless communication between numerous aerial vehicles. In various implementations, the network interface 916 may support communication via wireless general data networks, such as a Wi-Fi network. For example, the network interface 916 may support communication via telecommunications networks, such as cellular communication networks, satellite networks, and the like.

Input/output devices 917 may, in some implementations, include one or more displays, imaging devices, thermal sensors, infrared sensors, time of flight sensors, accelerometers, pressure sensors, weather sensors, various other sensors described herein, etc. Multiple input/output devices 917 may be present and controlled by the aerial vehicle control system. One or more of these sensors may be utilized to control functions or operations related to determining reflected propeller noise, processing reflected noise to detect objects, vehicles, and properties thereof, controlling or instructing operations of an aerial vehicle based on detected objects, vehicles, and properties thereof, and/or any other operations or functions described herein.

As shown in FIG. 9, the memory may include program instructions 922, which may be configured to implement the example routines and/or sub-routines described herein. The data storage 924 or stored object data 826 may include various data stores for maintaining data items that may be provided for operations and navigation of an aerial vehicle, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 115, 215 is merely illustrative and is not intended to limit the scope of the present disclosure. In particular, the computing system and devices may include any combination of hardware or software that can perform the indicated functions. The aerial vehicle control system may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the aerial vehicle control system may be transmitted to the aerial vehicle control system via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and control systems should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

While the above examples have been described with respect to aerial vehicles, the disclosed implementations may also be used for other forms of vehicles, including, but not limited to, ground based vehicles, unmanned ground based vehicles, water based vehicles, or unmanned water based vehicles.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical. Furthermore, as used herein, "horizontal" flight refers to flight traveling in a direction substantially parallel to the ground (e.g., sea level), and "vertical" flight refers to flight traveling substantially radially outward from or inward toward the earth's center. It should be understood by those having ordinary skill that trajectories may include components of both "horizontal" and "vertical" flight vectors.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
    during an aerial flight of an aerial vehicle:
        computing, for the aerial vehicle and during the aerial flight, a state prediction of the aerial vehicle, wherein the state prediction is an estimate of a state of the aerial vehicle and indicates at least one of an altitude of the aerial vehicle, an orientation of the aerial vehicle, a heading of the aerial vehicle, a dead reckoning of the aerial vehicle, a pose of the aerial vehicle, a speed of the aerial vehicle, a velocity of the aerial vehicle, a pitch of the aerial vehicle, a yaw of the aerial vehicle, or a roll of the aerial vehicle;
        obtaining, from at least one camera of the aerial vehicle, image data generated at a first time by the at least one camera, the image data representative of an environment in which the aerial vehicle is operating at the first time;
        processing the image data to at least:
            determine an object represented in the image data; and
            determine a first plurality of attributes corresponding to the object;
        obtaining, from a data store, stored object attributes corresponding to the object,
        wherein the stored object attributes is accurate for the object;
        determining a first confidence score indicating a first confidence that the object was correctly determined;
        determining that the first confidence score exceeds a threshold;
        determining, based at least in part on a determination that the first confidence score exceeds the threshold, a difference between the first plurality of attributes and the stored object attributes; and
        updating, for the aerial vehicle, the state prediction of the aerial vehicle to correct for a cumulative error that occurs in the state of the aerial vehicle during the aerial flight, wherein the state prediction is updated based at least in part on the difference.

2. The computer-implemented method of claim 1, wherein the first plurality of attributes include one or more of a size of the object, a shape of the object, a type of the object, a dimension of the object, a speed of the object, a velocity of the object, an orientation of the object, an angle of the object, a position of the object, a texture of the object, or a curvature of the object.

3. The computer-implemented method of claim 1, wherein processing the image data further includes, processing the image data to at least:
    determine a second object represented in the image data; and
    determine a second plurality of attributes corresponding to the second object.

4. The computer-implemented method of claim 3, further comprising:
    determining a second confidence score indicating a second confidence that the second object was correctly determined;
    determining that the first confidence score is higher than the second confidence score; and
    wherein determining the difference is in response to determining that the first confidence score is higher than the second confidence score.

5. The computer-implemented method of claim 3, further comprising:
    determining a second confidence score indicating a second confidence that the second object was correctly determined;
    determining that the second confidence score exceeds the threshold; and
    wherein determining the difference includes determining the difference between the second plurality of attributes and second stored objects attributes corresponding to the second object.

6. A vehicle apparatus, comprising:
    one or more propulsion mechanisms;
    a plurality of sensors;
    one or more processors; and
    a memory storing program instructions that when executed by the one or more processors cause the one or more processors to at least:
        compute, for the vehicle apparatus, a state prediction of the vehicle apparatus, wherein the state prediction is an estimate of a current state of the vehicle apparatus and indicates at least one of an altitude of the vehicle apparatus, an orientation of the vehicle apparatus, a heading of the vehicle apparatus, a dead reckoning of the vehicle apparatus, a pose of the vehicle apparatus, a speed of the vehicle apparatus, a velocity of the vehicle apparatus, a pitch of the vehicle apparatus, a yaw of the vehicle apparatus, or a roll of the vehicle apparatus;

receive, during in-transit navigation of the vehicle apparatus, sensor data from one or more of the plurality of sensors, wherein the sensor data is generated by one or more of the plurality of sensors during the in-transit navigation of the vehicle apparatus and is representative of an environment in which the vehicle apparatus is operating;

process the sensor data to at least:
determine an object represented in the sensor data; and
determine measured attributes corresponding to the object;

determine a first confidence score indicating a first confidence that the object was correctly determined;

determine that the first confidence score exceeds a threshold;

determine, based at least in part on a determination that the first confidence score exceeds the threshold, a difference between the measured object attributes and stored object attributes of the object; and update, for the vehicle apparatus and during the in-transit navigation, the state prediction of the vehicle apparatus to correct for a cumulative error that occurs in the state of the vehicle apparatus during the in-transit navigation, wherein the state predication is updated based at least in part on the difference.

7. The vehicle apparatus of claim 6, wherein the cumulative error is introduced by at least one of the plurality of sensors.

8. The vehicle apparatus of claim 6, wherein the plurality of sensors include at least one of a Global Positioning System ("GPS") sensor, an Inertial Measurement Unit ("IMU"), an accelerometer, a gyroscope, a compass, an odometry sensor, a camera, a Light Detection and Ranging ("LIDAR") sensor, a magnetometer, a pitot tube, a barometer, or an Inertial Navigation System ("INS").

9. The vehicle apparatus of claim 6, wherein the program instructions that when executed by the one or more processors to process the sensor data, further include program instructions that, when executed by the one or more processors, further cause the one or more processors to at least:
determine a plurality of objects represented in the sensor data; and
determine, for each of the plurality of objects, measured object attributes corresponding to the object.

10. The vehicle apparatus of claim 6, wherein the object includes a pattern of objects within the environment.

11. The vehicle apparatus of claim 6, wherein the object is at least one of: a field, a neighborhood, a street, a car, a house, a tree, a building, a bridge, a road, river, lake, pond, or a parking lot.

12. The vehicle apparatus of claim 6, wherein the program instructions when executed by the one or more processors further cause the one or more processors to at least:
determine a second confidence score indicating a second confidence that a second object represented in the sensor data was correctly determined;
determine that the first confidence score is higher than the second confidence score; and wherein determination of the difference is in response to a determination that the first confidence score is higher than the second confidence score.

13. The vehicle apparatus of claim 6, wherein the program instructions when executed by the one or more processors further cause the one or more processors to at least:
determine a second confidence score indicating a second confidence that a second object represented in the sensor data was correctly determined;
determine that the second confidence score exceeds the threshold; and
wherein:
determination of the difference further includes:
determination of second difference between second measured attributes for the second object and second stored object attributes of the second object; and
wherein the state prediction is adjusted based at least in part on one or more of the difference or the second difference.

14. The vehicle apparatus of claim 6, wherein the vehicle apparatus is at least one of: an aerial vehicle apparatus, an unmanned aerial vehicle apparatus, a ground based vehicle apparatus, an unmanned ground based vehicle apparatus, a water based vehicle apparatus, or an unmanned water based vehicle apparatus.

15. A method, comprising:
computing, for a vehicle, a state prediction of the vehicle, wherein the state prediction is an estimate of a current state of the vehicle and indicates at least one of an altitude of the vehicle, an orientation of the vehicle, a heading of the vehicle, a dead reckoning of the vehicle, a pose of the vehicle, a speed of the vehicle, a velocity of the vehicle, a pitch of the vehicle, a yaw of the vehicle, or a roll of the vehicle;
receiving, during in-transit navigation of a vehicle, image data from a camera coupled to the vehicle, wherein the image data is generated by a camera during the in-transit navigation of the vehicle and is representative of an environment in which the vehicle is operating;
processing the image data to determine measured attributes of one or more objects represented in the image data;
determining that a confidence score associated with the measured attributes of the one or more objects exceeds a threshold;
determining, based at least in part on a determination that the confidence score exceeds the threshold, a difference between the measured attributes and stored object attributes of the one or more objects represented in the image data; and
updating, for the vehicle and during the in-transit navigation of the vehicle, the state prediction of the vehicle to correct for a cumulative error that occurs in the state of the vehicle during the in-transit navigation, wherein the state predication is updated based at least in part on the difference.

16. The method of claim 15, further comprising:
processing the image data to determine a type of each of the one or more objects; and
wherein the stored object attributes of the one or more objects are obtained from a data store based at least in part on the type of each of the one or more objects.

17. The method of claim 15, wherein the difference is representative of an error in at least one of a position of the vehicle, an orientation of the vehicle, an altitude of the vehicle, a heading of the vehicle, a velocity of the vehicle, a sensor of the vehicle, or a camera parameter of a camera of the vehicle.

18. The method of claim 15, wherein the measured attributes include one or more of a size of the one or more objects, a shape of the one or more objects, a model of the one or more objects, a dimension of the one or more objects, a speed of the one or more objects, a velocity of the one or more objects, an angle of the one or more objects, a position of the one or more objects, a texture of the one or more objects, a curvature of the one or more objects, or a pattern formed by the one or more objects.

19. The method of claim 15, wherein the difference is an error is introduced from at least one of a prior prediction of the vehicle or sensor data of the vehicle.

20. The method of claim 15, further comprising:
correcting, during in-transit navigation of the vehicle and based at least in part on the difference, at least one sensor of the vehicle.

* * * * *